Jan. 28, 1964 W. J. MILLER 3,119,973
FREQUENCY-STABILIZED TRANSISTOR OSCILLATOR
Filed July 14, 1958
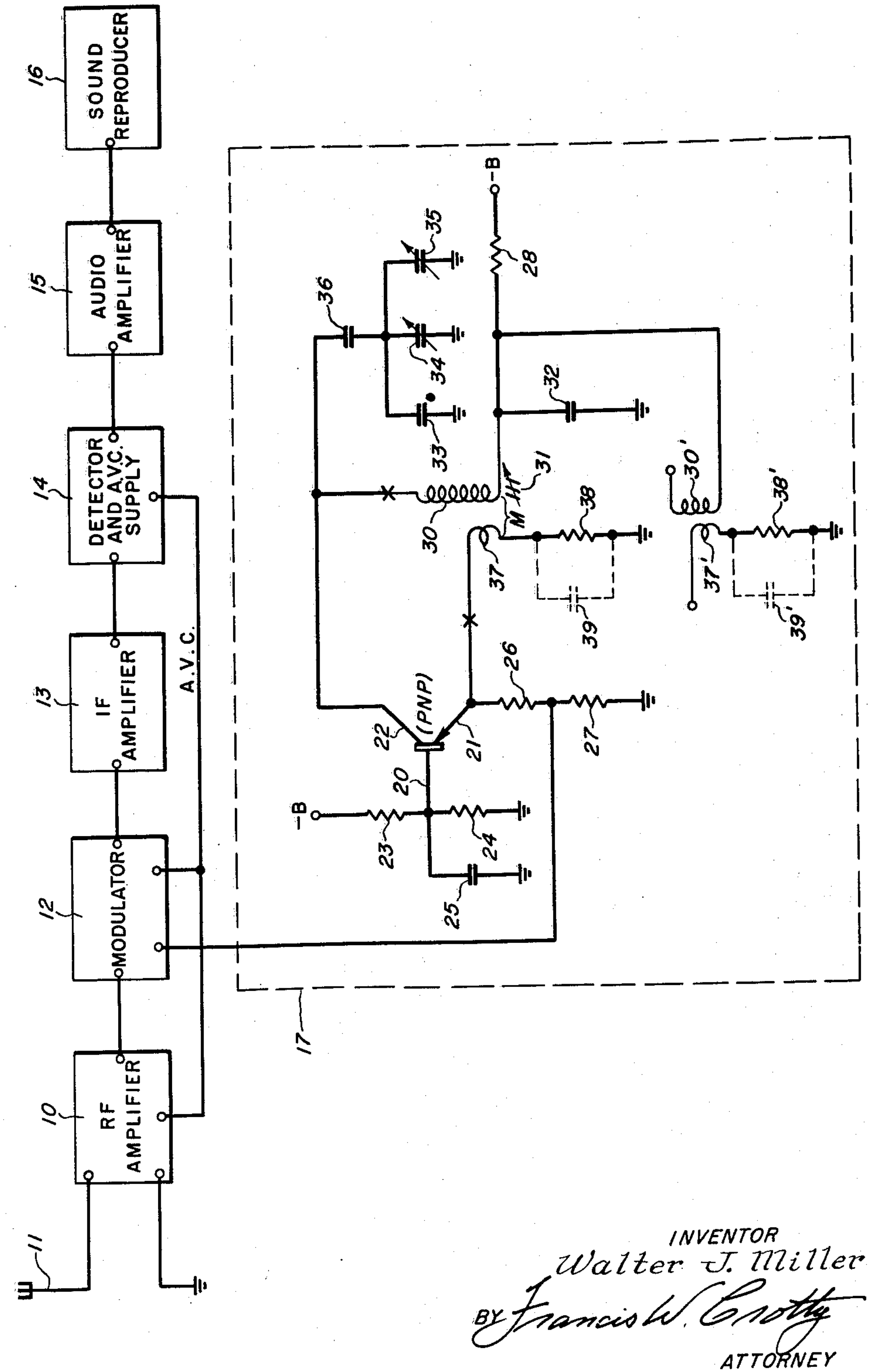
INVENTOR
Walter J. Miller
BY Francis W. Crotty
ATTORNEY United States Patent Office 3,119,973
Patented Jan. 28, 1964

3,119,973

FREQUENCY-STABILIZED TRANSISTOR OSCILLATOR

Walter J. Miller, Evanston, Ill., assignor to Zenith Radio Corporation, a corporation of Delaware Filed July 14, 1958, Ser. No. 748,329
3 Claims. (Cl. 331—117)

The present invention is concerned with the construction of a transistor oscillator and relates particularly to a frequency stable oscillator especially suited for use in a multi-band wave-signal receiver.

Transistor circuitry has a uniquely advantageous application of portable wave-signal receivers for the obvious reason that the transistor device has very small physical dimensions and permits the use of a battery-type power supply which likewise is very small. Accordingly, there is a marked trend to the development of portable wave-signal receivers taking advantage of these properties of transistors.

One outstanding wave-signal receiver is of the multi-band type and may be characterized as an all-wave instrument, being arranged for reception on the standard broadcast band and the several shortwave and other communication bands currently in use. Experience with that receiver has focused attention on the need for an improved transistor oscillator with enhanced frequency stability in the face of variations in excitation potential. It is found, for example, that such a receiver having a battery constituting a nominal 12-volt supply is subject to variations as batteries age and may suffer a decrease in terminal voltage to approximately 7 volts. While oscillator circuitry is known for use in the broadcast band which maintains adequate frequency stability in the face of such potential variations, such oscillators do not maintain their stability on the shortwave bands, particularly those which feature spread-band tuning. Numerous proposals have been made to improve frequency stability but they require sophisticated compensating networks, such as feedback arrangements, and other approaches which entail an undesirable number of added components to the oscillator circuit. In the portable instrument where space considerations are of paramount importance, it is highly desirable to minimize the number of circuit components required. Accordingly, prior proposals for accomplishing frequency stability do not lend themselves particularly well to such devices.

It is accordingly an object of the present invention to provide a transistor oscillator of improved frequency stability which avoids one or more of the aforementioned limitations of the prior art.

It is another object of the invention to provide a transistor oscillator which has improved frequency stability in the presence of variations in excitation potential.

Another object of the invention is to provide a simplified inexpensive oscillatory circuit featuring the use of a transistor device and having improved frequency stability even though it may experience variations in excitation potential.

It is a specific object of the invention to provide an improved transistor oscillator for a multi-band portable wave-signal receiver.

A transistor oscillator, constructed in accordance with the present invention to exhibit frequency stability in the presence of variations in excitation potential, comprises a semi-conductor device including a semi-conductor body having base, emitter and collector electrodes connected therewith. A direct-current biasing arrangement, including a potential source subject to variation and further including resistor returning each of the electrodes to a plane of reference potential, establishes a forward bias between the base and emitter electrodes and further establishes a reverse bias between base and collector electrodes. A resonant circuit tuned to a desired operating frequency is connected to one of the electrodes and a saturation-inhibiting and feedback means is coupled to that resonant circuit and connected with another of the electrodes. The feedback circuit is in parallel relation to the biasing resistor by which such other electrode is returned to the plane of reference potential and has a high direct-current impedance relative to that biasing resistor. The feedback means in conjunction with the resonant circuit and the semi-conductor device constitute an oscillatory system having a degree of feedback which is controlled to an amount less than required to create a saturation condition in a semiconductor body during any substantial portion of the oscillatory cycle.

In accordance with one feature of the invention, the feedback circuit comprises a coil having as few coil turns as practicable and connected in series with a resistor of high value having a distributed capacitance which, in effect, controls the degree of feedback to the extent required.

The features of the present invention which are believed to be novel are set forth with particularity in the appended claims. The organization and manner of operation of the invention, together with further objects and advantages thereof, may best be understood by reference to the following description taken in connection with the accompanying drawing, the single figure of which represents, in block and schematic form, a wave-signal receiver embodying the subject invention.

Referring now more particularly to the drawing, the receiver there represented comprises a radio-frequency amplifier 10 of any desired number of stages having input terminals connected to an antenna system 11. Coupled in cascade to amplifier 10 are a modulator 12, a multi-stage intermediate-frequency amplifier 13, a detector and A.V.C. supply 14, an audio amplifier 15 of any desired number of stages, and a sound reproducer 16 which is the customary loudspeaker. An oscillator, constructed in accordance with the invention and enclosed within broken-line rectangle 17, is coupled as a heterodyning signal source to modulator 12. Aside from the circuitry of oscillator 17, the described receiver may be of conventional design and construction and it will be understood that a multi-section band switch and station selector mechanism, not shown, is included to effect band selection for R-F amplifier 10, modulator 12 and heterodyning oscillator 17 and further to accomplish station selection within any such band. As is well understood, both the band switching and interstation selection within a band are accomplished in unicontrol fashion so that units 10, 12 and 17 and tuned simultaneously as required to condition the receiver to accept signals within any desired band and to make a signal selection in any band chosen for reception.

Since such a system is generally well understood, it is not necessary to illustrate details except as to hererodyning oscillator 17 to which the invention is particularly directed. For the same reason, it is not necessary to describe exhaustively its operation. In brief, the band selector of the receiver is manipulated manually to condition the receiver to accept signals within any particular one of the several frequency bands which it is capable of accepting. Having chosen the band by manipulation of the band selector, the tuning control or station selector is manipulated to tune R-F amplifier 10 and modulator 12 to accept one particular signal within the chosen band and, at the same time, oscillator 17 is adjusted as to operating frequency to the end that it supplies a heterodyning signal so related in frequency to the received signal that modulator 12 develops an intermediate frequency of appropriate frequency value. The intermediate-frequency signal, after amplification in unit 13, is detected in unit 14 and the intelligence or modulation components are amplified in audio amplifier 15 and delivered to sound reproducer 17 for reproduction.

The A.V.C. supply included within unit 14 develops, in the usual way, a bias potential which varies inversely with the strength of the received signal. The A.V.C. potential is applied to R-F amplifier 10 and modulator 12 to vary the operating bias and gain of such stages to minimize the effect of variations in signal intensity. Thus, the influence of the A.V.C. supply causes the signal input to detector 14 to vary over a relatively narrow range of amplitudes in spite of a much wider variation in strength of the received signal.

Particular attention is now directed to hetrodyning oscillator 17. In comprises a semi-conductor device having base, emitter and collector electrodes 20, 21 and 22 coupled to a semi-conductor body in the usual way. In its most common form, the transistor is a semi-conductor body having two zones of one type conductivity and an interposed zone of opposite type conductivity and each of the electrodes is connected with one such zone. As illustrated, the transistor is of the P-N-P type.

Such a device requires a direct-current biasing arrangement which, for the oscillator circuit under consideration, establishes a forward bias between base and emitter electrodes and a reverse bias between the base and collector electrodes. The biasing arrangement in question includes a potential source designated —B which may be one or several batteries and, therefore, subject to variations in potential as the batteries are used and age. The biasing arrangement further includes resistors returning each of the electrodes to a source of reference potential, which, for convenience, is shown as a ground plane. More particularly, base 20 connects to the junction of resistors 23, 24 connected in series between battery terminal —B and ground. A condenser 25 in shunt to resistor 24 is provided for stabilizing purposes and is chosen to the end that the base, so far as alternating current operation is concerned, is maintained at essentially ground potential. Emitter electrode 21 is returned to ground through series-connected resistors 26, 27 and a connection from their junction extending to modulator 12 constitutes means for deriving an output signal from the oscillator for application to the modulator. Resistor 28, in conjunction with other circuit components presently to be considered, returns collector electrode 22 to ground through battery —B.

The operating frequency of the oscillator is determined by a resonant circuit tunable over a range of frequencies and connected with one of the electrodes. As illustrated, the resonant circuit is connected with the collector and comprises an inductor 30 which may have an adjustably set tuning slug indicated by the symbol 31. If the end of inductor 30 connected to collector 22 be termed its high potential terminal, the opposite or low potential terminal is returned to ground through a by-pass condenser 32. The symbol "X" interposed between inductor 30 and collector 22 represents a switching contact through which this particular coil is included in the resonant circuit to determine the band of frequencies over which the heterodyning oscillator is tunable. The capacitive reactance of the resonant circuit is provided by three parallel connected condensers 33, 34, 35, at least one of which is adjustable to tune the oscillator over the band contemplated by the inductance presented in inductor 30. These parallel connected and tuning condensers are connected in series with a band-spread condenser 36 across inductor 30.

As in any oscillatory circuit, feedback is required from the output to the input and in the case of oscillator 17, is provided by a saturation-inhibiting and feedback means for completing with resonant circuit 30—36 and the semiconductor an oscillatory system and for controlling the degree of feedback therein to an amount less than that required to create a saturation condition in the semi-conductor body during any substantial portion of the oscillatory cycle. This feedback means is connected with another of the transistor electrodes in parallel relation to the biasing resistor through which that other electrode is returned to ground and its direct-current impedance is very high compared to such biasing resistor. More specifically, the feedback circuit comprises a reactive impedance of one type—an inductive reactance provided by a feedback coil 37—coupled in signal transfer relation with inductor 30 of the resonant circuit. The feedback circuit further includes a series-connected reactive impedance of opposite type—a resistor 38 which has a distributive capacitance 39 to ground shown in broken-construction line. These two elements 37 and 38 are series-connected with emitter 21 in parallel relation to biasing resistors 26, 27 and the direct-current resistance of the feedback path, which is determined predominantly by resistor 38, is high compared to that of the biasing resistors. Actually, feedback coil 37 is made as small as practicable and usually includes no more than two turns. Even making this feedback coil as small as practicable results in a sufficient degree of feedback to effect "bottoming" or saturation within the transistor in each oscillatory cycle in the absence of compensation and experience shows that bottoming leads to frequency instability. The capacitive reactance represented by stray capacitance 39 in effect reduces the degree of feedback or controls the degree of feedback to an amount less than that resulting in saturation.

The oscillatory circuit will be recognized as generally similar to a tuned plate vacuum tube oscillator with a tickler or feedback coil inductively coupled to the resonant frequency determining circuit. Its fundamental principle of oscillation is essentially the same as that of such a vacuum tube oscillator and need not be recited in detail. It is found that the energy fed back due to the mutual coupling M of inductors 30, 37 generally is sufficient to result in saturation of the transistor. This is a condition in which the emitter is in effect short-circuited to the collector and is attended by the creation or injection of minority carriers into the semi-conductor body at a greater rate than the circuit dissipates them and so saturation sets in. In the face of saturation, the frequency of operation becomes unstable and, in fact, varies inversely with variations in excitation potential. This phenomenon of frequency variation, which is of course undesirable in a multi-band or in any super-heterodyning wavesignal receiver, is attributable to the increased time required for the excess minority carriers to be swept out of the transistor in each oscillatory cycle. This has a tendency to extend or elongate the ½-cycle of oscillation during which the emitter is in effect short-circuited to the collector and results in lowering the frequency as the voltage is increased.

This undesired dependance of operating frequency upon exciting potential is avoided in the described arrangement by proportioning capacitive reactance 39 in relation to the inductive reactance 37 to obtain a controlled degree of feedback which is less than the amount required for the saturation phenomenon. One might contemplate reduction in the feedback to achieve frequency stability by operating upon the physical characteristics of the tickler or feedback coil 37 but experience shows that there is not sufficient leeway available to achieve the necessary control of coupling. Even constructing the feedback to have as small a size as practicable does not reduce the coupling to the extent required. No sufficient relief is afforded by increasing the space separation of inductors 30, 37 because the portable receiver is characterized by a maximum of operating circuitry in a minimum of physical space and there is not enough available free space to accommodate this approach to the problem. The described compensation realized by the use of resistor 38 contributing distributed capacitive reactance 39 permits the necessary operating requirements to be achieved within the limits of space available in a compact, multi-band all-wave receiver.

Resistor 38 has been described as having a direct-current impedance high with respect to biasing resistors 26, 27. This is desirable because it permits the direct-current biasing arrangement to be largely independent of the feedback circuit and affords desirable degrees of freedom in establishing the best direct-current conditions consonant with maximum stability. Constructing the circuit in the manner described facilitates adjustment of the direct-current conditions by selection of resistors 23, 24, 26, 27 and 28 plus the selection of the operating potential source.

Inductor 30' shows one of the several other inductors that may be switched into the frequency-determining circuit of the oscillator by operation of the band switch. Concurrently therewith additional feedback circuits are switched into connection with the emitter. One of the several alternate combinations of components that may be switched in to constitute the feedback path is shown and designated 37'—39'.

Obviously, the invention is not restricted to an oscillator wherein the frequency-determining circuit is connected to the collector and the feedback circuit is connected to the emitter. Other well-known forms of oscillatory circuits are suitable. For example, the feedback coil might readily be connected in circuit with the base electrode.

One form of oscillator, corresponding in circuitry to that represented in the figure and operated with highly satisfactory results, employed the following components:

| | |
|---|---|
| Transistor **20—22** | Type 2N247. |
| Resistor **23** | 10,000 ohms. |
| Resistor **24** | 470 ohms. |
| Resistor **26** | 560 ohms. |
| Resistor **27** | 82 ohms. |
| Resistor **28** | 820 ohms. |
| Resistor **38** | 2,700 ohms. |
| Condenser **25** | .05 microfarad. |
| Condenser **33** | 100 micromicrofarads. |
| Condenser **34** | 600 micromicrofarads. |
| Condenser **35** | 50 micromicrofarads. |
| Condenser **36** | 60 micromicrofarads. |
| Condenser **39** | .5 micromicrofarad. |
| Inductor **30** | 4.29 microhenries. |
| Inductor **37** | 2 turns of #36 insulated wire, 5/16" O.D. |
| Operating band | 9.4–10 megacycles. |
| Battery voltage | 12 volts. |
| Frequency variation | 14 kilocycles with a change in battery from 12 to 7 volts. |

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A transistor oscillator exhibiting frequency stability in the presence of variations in excitation potential comprising: a semi-conductor device including a semi-conductor body having base, emitter and collector electrodes coupled therewith; a direct-current biasing arrangement including a potential source subject to variations in potential and further including resistors returning each of said electrodes to a plane of reference potential for establishing a forward bias between said base and emitter electrodes and a reverse bias between said base and collector electrodes; a resonant circuit tuned to a predetermined operating frequency connected with one of said electrodes; and a feedback circuit connected with another of said electrodes in parallel relation to the biasing resistor connected to such electrode comprising a reactive impedance of one type coupled in signal-transfer relation with said resonant circuit and a series-connected reactive impedance of opposite type, said feedback circuit having a direct-current impedance which is high relative to that of said biasing resistor, and having an effective net reactance of said one type providing a degree of feedback less than that required to create a saturation condition in said semi-conductor body during any substantial portion of the oscillatory cycle.

2. A transistor oscillator exhibiting frequency stability in the presence of variations in excitation potential comprising: a semi-conductor device including a semi-conductor body having base, emitter and collector electrodes coupled therewith; a direct-current biasing arrangement including a potential source subject to variations in potential and further including resistors returning each of said electrodes to a plane of reference potential for establishing a forward bias between said base and emitter electrodes and a reverse bias between said base and collector electrodes; a resonant circuit tuned to a predetermined operating frequency connected with one of said electrodes; and a feedback circuit connected with another of said electrodes in parallel relation to the biasing resistor connected to such electrode comprising a coil coupled in signal-transfer relation with said resonant circuit and a series-connected impedance contributing a component of capacitive reactance and also a direct-current resistance which is high relative to that of said biasing resistor, said coil prividing a degree of feedback tending to create a saturation condition in said semi-conductor in each oscillatory cycle and said capacitive reactance controlling the degree of feedback to an amount less than that required to create a saturation condition in said semi-conductor body during any substantial portion of the oscillatory cycle.

3. A transistor oscillator exhibiting frequency stability in the presence of variations in excitation potential comprising: a semi-conductor device including a semi-conductor body having base, emitter and collector electrodes coupled therewith; a direct-current biasing arrangement including a potential source subject to variations in potential and further including resistors returning each of said electrodes to a plane of reference potential for establishing a forward bias between said base and emitter electrodes and a reverse bias between said base and collector electrodes; a resonant circuit tuned to a predetermined operating frequency connected with one of said electrodes; and a feedback circuit connected with another of said electrodes in parallel relation to the biasing resistor connected to such electrode comprising a coil coupled in signal-transfer relation with said resonant circuit and a series-connected resistor contributing a component of distributive capacitive reactance and also a direct-current resistance which is high relative to that of said biasing resistor, said coil providing a degree of feedback tending to create a saturation condition in said semi-conductor in each oscillatory cycle and said capacitive reactance controlling the degree of feedback to an amount less than that required to create a saturation condition in said semi-conductor body during any substantial portion of the oscillatory cycle.

References Cited in the file of this patent

UNITED STATES PATENTS

| | | |
|---|---|---|
| 2,556,286 | Meacham | June 12, 1951 |
| 2,811,643 | Eberhard | Oct. 29, 1957 |
| 2,836,724 | Kaminow | May 27, 1958 |
| 2,855,568 | Lin | Oct. 7, 1958 |

(Other references on following page)

OTHER REFERENCES

Handbook of Semiconductor Electronic, by Hunter. First ed., October 15, 1956, published by McGraw-Hill Book Co., page 14–9.

Transistor Theory and Practice, by Turner, 1954 ed., published by Hogo Gernsback, pages 67–68.

Transistors in Radio and Television, by Kiver, 1956 ed., published by McGraw-Hill Book Co., page 131.

Electronic Circuits and Tubes, by Cruft Electronic Staff, published by McGraw-Hill Co. Inc., 1947, pages 58–61.